US008276882B2

(12) United States Patent  
Jockisch (10) Patent No.: US 8,276,882 B2  
(45) Date of Patent: Oct. 2, 2012

(54) WIRE BUNDLE PULL TOOL (75) Inventor: Danny G. Jockisch, Everett, WA (US)

(73) Assignee: The Boeing Company, Chicago, IL (US)

( * ) Notice: Subject to any disclaimer, the term of this patent is extended or adjusted under 35 U.S.C. 154(b) by 1097 days.

(21) Appl. No.: 12/184,545

(22) Filed: Aug. 1, 2008

(65) Prior Publication Data

US 2010/0025644 A1 Feb. 4, 2010

(51) Int. Cl.
- B66F 3/00 (2006.01)
- B63B 35/03 (2006.01)
- B65H 59/00 (2006.01)
- E21C 29/16 (2006.01)
- H01B 7/00 (2006.01)
- H01B 7/29 (2006.01)
- H01B 11/06 (2006.01)
- H02G 1/06 (2006.01)

(52) U.S. Cl. ............... 254/134; 254/134.3 R; 174/135; 174/36

(58) Field of Classification Search ............ 254/134, 254/134.3 R; 174/135, 36, 72 A, 117 M, 174/68.3

See application file for complete search history.

(56) References Cited

U.S. PATENT DOCUMENTS

| 3,080,892 A * | 3/1963 | Plummer | 138/128 |
|---|---|---|---|
| 4,368,762 A * | 1/1983 | Peterpaul | 140/93 A |
| 4,371,010 A * | 2/1983 | Hidassy | 140/93 A |
| 4,804,806 A * | 2/1989 | Orr et al. | 174/117 M |
| 4,930,543 A * | 6/1990 | Zuiches | 138/110 |
| 4,939,819 A * | 7/1990 | Moyer | 24/16 R |
| 4,954,939 A * | 9/1990 | Hutchins | 362/406 |
| 4,979,614 A * | 12/1990 | Ruhaut | 206/702 |
| 5,016,859 A * | 5/1991 | Zimmer et al. | 254/134.3 R |
| 5,064,970 A * | 11/1991 | Bennett et al. | 174/135 |
| 5,178,923 A * | 1/1993 | Andrieu et al. | 428/36.1 |
| 5,293,501 A * | 3/1994 | Bennett et al. | 174/135 |
| 5,373,103 A * | 12/1994 | Orr et al. | 174/36 |
| 5,720,322 A * | 2/1998 | Soderberg et al. | 139/420 A |
| 5,861,579 A * | 1/1999 | Bickersteth et al. | 174/136 |
| 5,979,322 A * | 11/1999 | DeMoore et al. | 101/401.1 |
| 6,233,796 B1 * | 5/2001 | van Wassenhove et al. | 28/100 |
| 6,476,323 B2 * | 11/2002 | Beebe et al. | 174/72 A |
| 6,523,584 B1 * | 2/2003 | Rehrig | 150/154 |
| 6,610,928 B2 * | 8/2003 | Synder | 174/68.3 |
| 6,701,580 B1 * | 3/2004 | Bandyopadhyay | 24/16 R |
| 6,737,574 B2 * | 5/2004 | Sylvia et al. | 174/36 |
| 6,993,237 B2 * | 1/2006 | Cooke et al. | 385/135 |

(Continued)

OTHER PUBLICATIONS

Keefe Performance, "KP Performance 1800F continuous temperature/flame resistant reflective hose and electrical cable thermal wrap" <http://www.keefeperformance.com/aerowrap.html> last visited on Jul. 21, 2008.

Primary Examiner — Lee D Wilson  
Assistant Examiner — Alvin Grant  
(74) Attorney, Agent, or Firm — Novatech IP Law (57) ABSTRACT A pull tool for handling an elongate article comprises a panel having opposing panel sides and opposing panel ends and a fastening mechanism extending along at least a portion of the panel sides. The fastening mechanism is configured to join the panel sides to form the panel in a sleeve configuration for encasing the elongate article therewithin. The panel of the pull tool has inner and outer surfaces with the outer surface having a substantially low coefficient of friction.

21 Claims, 7 Drawing Sheets

U.S. PATENT DOCUMENTS

| | | | |
|---|---|---|---|
| 7,078,615 B2 * | 7/2006 | Gladfelter et al. | 174/36 |
| 7,119,279 B2 * | 10/2006 | Niehaus et al. | 174/72 A |
| 7,188,642 B2 * | 3/2007 | James et al. | 139/384 R |
| 7,438,964 B2 * | 10/2008 | Clark | 428/40.1 |
| 7,591,679 B2 * | 9/2009 | Mori et al. | 439/595 |
| 7,754,971 B2 * | 7/2010 | Bedingfield et al. | 174/117 M |
| 7,901,756 B2 * | 3/2011 | Burr et al. | 428/123 |
| 2006/0054346 A1 * | 3/2006 | Gladfelter et al. | 174/74 A |
| 2008/0084076 A1 * | 4/2008 | Van Sloun | 294/19.1 |
| 2010/0293698 A1 * | 11/2010 | Burr et al. | 2/243.1 |

\* cited by examiner

WIRE BUNDLE PULL TOOL

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to electrical wiring systems and, more particularly, to a uniquely configured pull tool specifically adapted for protecting electrical wiring and primary structure during handling and installation of the electrical wiring.

BACKGROUND

Many vehicles such as aircraft include electrical wiring systems for distribution of electrical signals and/or power throughout the aircraft. Such electrical wiring systems comprise wire bundles having connectors, termini and various other components such as relays and circuit breakers. In large aircraft such as commercial airliners and freighters, wire bundles can reach up to 50 feet or more in length.

Current methods of installing the electrical wiring systems in an aircraft include the individual installation of each wire bundle in one-at-a-time fashion due, in part, to the length of the wire bundles. Three or more people may be required for the installation of each wire bundle wherein the wire bundle must be carefully routed through various structural members such as through the hundreds of intercostals that may be disposed along a cabin subfloor or through a wing of a large aircraft.

Because of the large number of wire bundles and the large number of structures around which the wire bundles must be routed, installation of electrical wiring systems in aircraft can be a difficult, time-consuming and labor-intensive process. Adding to the difficulty of such installations is the relatively cramped quarters wherein such wire bundles may be routed such as within the cabin subfloor or along the aircraft wing.

Adding to the length of time required to install an electrical wiring system, each wire bundle may require permanent attachment to supporting members in the vehicle at spaced intervals to prevent movement of the wire bundle relative to adjacent wiring or structure. In this regard, the wire bundles may be individually secured to a number of spanner bars that, in turn, may be attached to various structure within an aircraft following installation of the wiring bundles.

In addition to the length of time required for installation of electrical wiring systems, current methods present other disadvantages. For example, conventional installation methods may undesirably affect the electrical wiring system at certain locations thereof such as at the junction between connectors and the wiring or conductors to which such connectors may be fastened. Such undesirable effects may occur if the connector catches on a piece of structure when the wire bundle is routed through the aircraft during installation.

Another problem associated with current methods for installing electrical wiring systems is related to undesirable effects that may occur to the structure over which such electrical systems are installed. For example, the installation of wiring bundles by routing through various structural members may result in undesirably affecting the surfaces and/or coatings on such structures.

For example, in certain aircraft, a corrosion inhibiting coating (CIC) may be applied to exterior surfaces of the central wing fuel tank. During installation of the wiring bundles, the passage of the connectors over the exterior surfaces may undesirably affect the CIC. Other various types of undesirable effects may occur to aircraft structure and/or to wire harness components during installation thereof. Such undesirable effects may be detectable visually or through continuity testing of the electrical wiring system.

As can be seen, there exists a need in the art for a system and method for installing elongate articles such as electrical wiring systems in vehicle and non-vehicular applications which minimizes undesirable effects to the electrical wiring system during installation thereof. Furthermore, there exists a need in the art for a system and method for installation of electrical wiring systems which minimizes or prevents undesirable effects to structure over which electrical systems may be installed. Finally, there exists a need in the art for a system and method for installation of electrical wiring systems which simplifies and reduces the amount of time required for such installations.

BRIEF SUMMARY

The above-described needs associated with the installation of electrical wiring systems are specifically addressed and alleviated by the embodiments disclosed herein. More specifically, a pull tool is provided for handling, installation and/or removal of various elongate articles such as, without limitation, wire harnesses in vehicular or non-vehicular applications such as in building structures. The pull tool preferably comprises an elongate, flexible, non-stretchable, protective sheet or panel that may be fabricated of a suitably strong material having a low coefficient of friction on an outer surface of the panel.

The panel has opposing panel sides and opposing panel ends when viewed in an open configuration. The pull tool may comprise at least one fastening mechanism such as hook and loop fastener material (i.e., Velcro) which preferably extends along at least a portion of the panel sides and, optionally, along at least one of the panel ends. The fastening mechanism is specifically configured to join the panel sides to one another after loading the elongate article onto the panel. With the panel sides joined, the pull tool may subsequently be formed into a sleeve configuration for encasing the elongate article. In the sleeve configuration, the pull tool may protect the elongate article from damage and may further protect structure located adjacent to where the elongate article is installed. The panel is preferably configured to be of a length and width that can encase the elongate article completely when the panel is in the sleeve configuration.

The technical effects of the embodiments disclosed herein include the ability to encase or wrap various elongate articles in the pull tool in order to facilitate installation thereof without damage to the elongate article or damage to a structure such as of a vehicle. Furthermore, the pull tool reduces the amount of time required to install various elongate articles such as wire harnesses which typically comprise a plurality of different wire bundles and which are installed and positioned adjacent to various structure and which must be subsequently secured against movement by attaching to separate support members such as by using spanner bars. Advantageously, the ability to secure the wire bundles to the spanner bars or other support members on a form board in a wiring facility prior to installation of the wire bundles inside a vehicle can reduce the amount of time and effort required to effectuate such installations.

As was earlier mentioned, the panel has inner and outer surfaces with the outer surface preferably being configured to facilitate sliding of the pull tool along various members of a vehicle. Toward this end, the outer surface is preferably provided with a substantially low coefficient of friction. The panel is preferably constructed of material that is suitably strong to prevent protrusions or breakouts of the elongate member which may otherwise snag on the vehicle during installation. The panel may be fabricated of any suitable material such as nylon which may be reinforced such as in a grid pattern with polyethylene threads or other high molecular-weight polyethylene materials or thermoplastics having a low coefficient of friction.

Reinforced nylon is a preferred material due to its low coefficient of friction which is significantly lower than the coefficient of friction exhibited by non-reinforced nylon and other materials. In this regard, nylon that is reinforced with polyethylene is understood to provide a coefficient of friction which is comparable to that of Teflon but which has better abrasion resistance than Teflon. Furthermore, reinforced nylon is understood to provide improved tear resistance and suitable strength. However, any other suitable material, either woven or non-woven, may be used for forming the panel. For example, various materials such as polyester materials, canvas or other materials that may be impregnated or coated with a low friction coating may be suitable.

The fastening mechanism is preferably provided as hook and loop fastener material (i.e., Velcro) although other fastening mechanisms such as zippers, snaps, buttons and other mechanical fastening means may be provided. Regardless of the configuration, the fastening mechanism is preferably mounted along at least a portion of the panel sides by any suitable means such as sewing, adhesive bonding and/or mechanical attachment. The fastening mechanism is preferably configured to detachably join the panel sides to one another such that the pull tool may be placed in either the open position or in the sleeve configuration for encasing the elongate article (e.g., one or more wire harnesses) therewithin. The panel is preferably sized and configured to be of a substantial length and width to completely encase or wrap the elongate article therewithin in the sleeve configuration. In this manner, the elongate article is protected during threading of the pull tool through or along various structure such as, for example, along the multiple intercostals and bulkheads that may be include in an aircraft.

In an optional embodiment, the pull tool may include fastening mechanisms placed along at least one of the panel ends such that the panel end may be closed off to protect the end of the elongate article and, more particularly, to protect the connectors and other components that may be mounted on the end of the wire harness or at intermediate locations along the length thereof. Optionally, both of the panel ends may be provided with fastening mechanisms such as hook and loop fastener material such that both panel ends may be closed off to completely seal the wire harness therewithin.

At least one clamping mechanism may be provided in order to fix the position of the elongate article relative to the panel inner surface. The clamping mechanism may comprise a plastic cable tie which may be extended through a pair of patch reinforced grommets. The clamping mechanism may be installed around a portion of the wire bundle for clamping to the pull tool. In a preferable embodiment, such clamping mechanisms may be installable at each of the opposing panel ends of the pull tool such that the wire harness cannot shift or slide lengthwise inside the pull tool during handling. Although cable ties are a preferable embodiment of the clamping mechanism, other mechanisms may be employed to fix or clamp the wire harness to the pull tool. For example, cable lacing, binding knots, twist ties, metal buckle clips or other devices may be used to clamp the wire harness to the pull tool.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
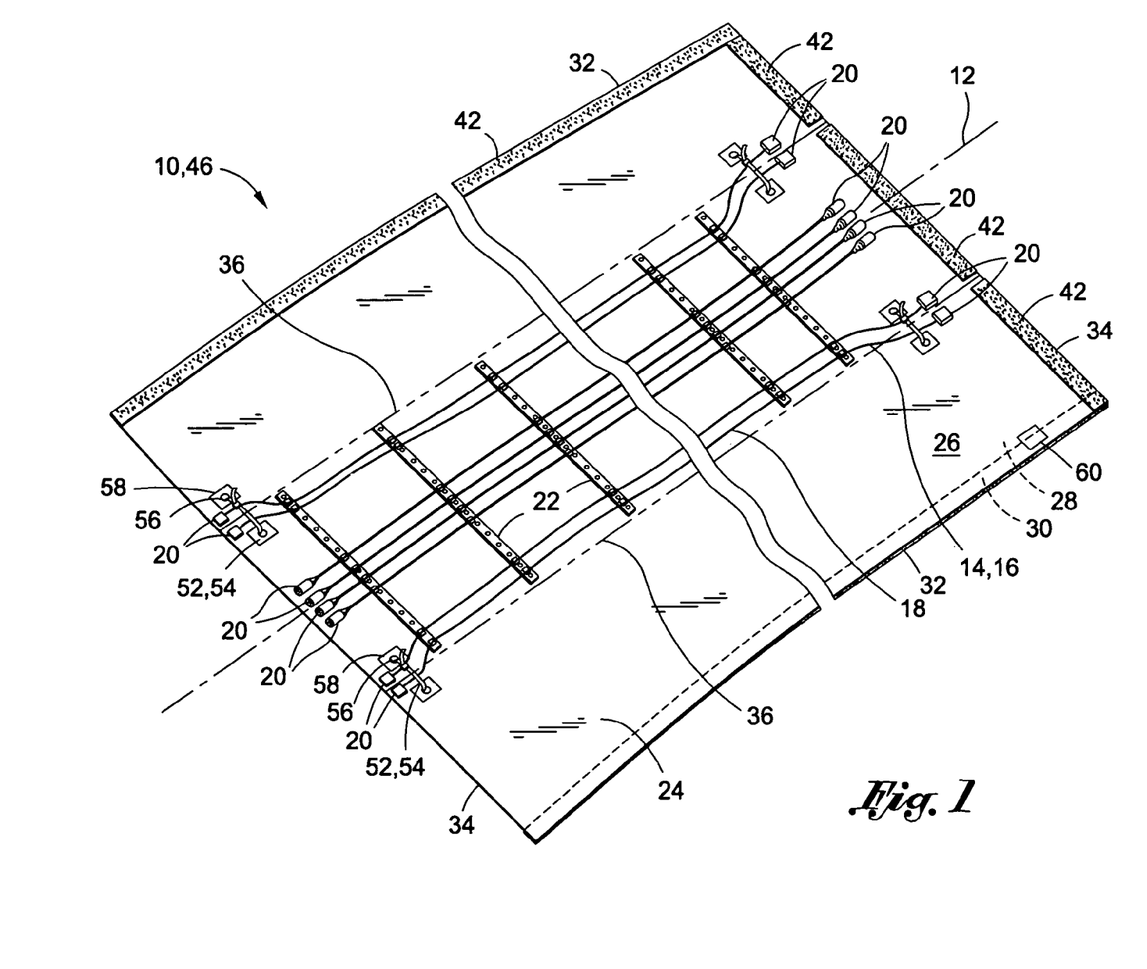
FIG. 1 is a perspective illustration of a pull tool comprising a panel having an elongate member such as a plurality of wire bundles installed thereon and further illustrating fastening mechanisms installed on opposing panel sides of the panel.

Referring now to the drawings wherein the showings are for purposes of illustrating preferred and various embodiments of the disclosure only and not for purposes of limiting the same, FIG. 1 is a perspective illustration of a pull tool 10 in an advantageous embodiment for encasing or wrapping an elongate article 14 such as a wire harness 16, wire bundle 18 and/or other object(s).

The pull tool 10 facilitates installation of elongate articles such as the wire harness 16 illustrated and disclosed herein in a reduced amount of time. Furthermore the pull tool 10 prevents damage to wire harnesses 16 and various components thereof during the installation process while simultaneously preventing damage to structure through which the wire harness 16 is installed. It should be noted that the elongate article 14 which may be encased by the pull tool 10 is not limited to wire harnesses 16 and/or wire bundles 18.

For example, the elongate article 14 may comprise any elongate object such as tubing or conduit for carrying fluids or other elongate articles and components of various structural, mechanical, electrical and other systems where installation without damage to the elongate article 14 or structure is desired. Furthermore, it should also be noted that the pull tool 10 is not limited for use in installations in aircraft and other vehicles. For example, the pull tool 10 may be utilized for installation in non-vehicular applications such as in building structures including office buildings, residential buildings, factories, and other applications.

Referring to FIG. 1, shown is the pull tool 10 which, in one embodiment, may be comprised of a sheet or panel 24 having opposing panel sides 32 and opposing panel ends 34 when the panel 24 is placed in an open configuration 46. At least one fastening mechanism 42 is provided along at least a portion of the panel sides 32 in order to join the panel sides 32 together for encasing the elongate article 14 such as the wire harness 16 illustrated. The panel 24 is preferably an elongate, flexible but non-stretchable protective panel 24 fabricated of appropriate material having inner and outer surfaces 26, 28. The perimeter edges of the panel 24 are preferably folded over themselves along the panel sides 32 and panel ends 34 in order to prevent exposure of selvage edges which could fray over time.

Importantly, the outer surface 28 preferably has a substantially low coefficient of friction in order to facilitate sliding installation of the pull tool 10 in confined spaces or along surfaces. Although the panel 24 is shown formed as a continuous elongate sheet, the panel 24 may be fabricated of panel sections 38 joined to one another using any suitable fastening means including, but not limited to, sewing, mechanical fastening, bonding or other means. However, the panel 24 is preferably of seamless construction in order to prevent snagging or catching of seams or discontinuities in the panel on various structure along which the pull tool 10 may be slidably installed.

Figure 4:
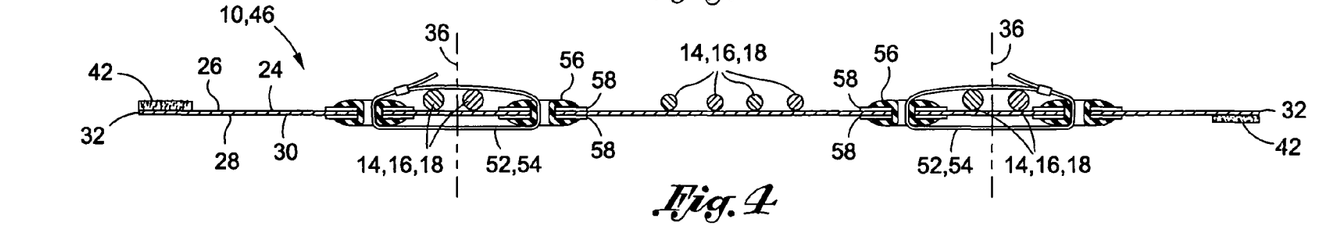
FIG. 4 is a sectional illustration taken along lines 4-4 of FIG. 2 and illustrating a pair of clamping mechanisms for securing the wire bundles to the panel.
Figure 5:
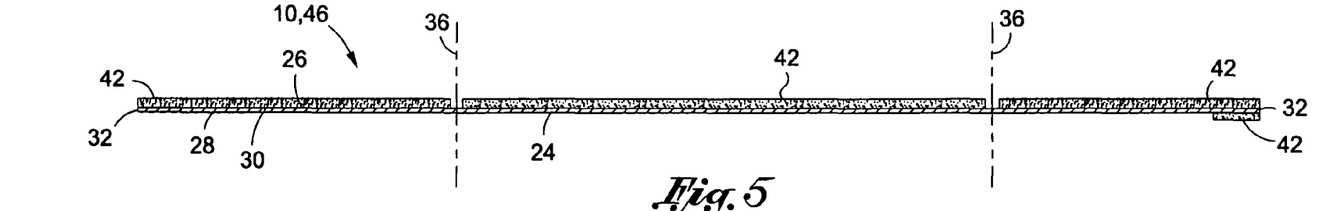
FIG. 5 is a sectional illustration taken along lines 5-5 of FIG. 2 and illustrating a fastening mechanism disposed on a panel end of the panel.
Figure 6:
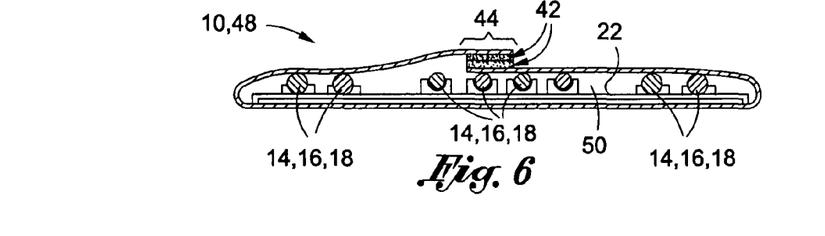
FIG. 6 is a sectional illustration of the pull tool in a sleeve configuration formed by the joining of the panel sides.

Referring to FIGS. 1-5, the fastening mechanism 42 may comprise any suitable fastening mechanism 42 but preferably includes hook and loop fastening material commercially known as Velcro and which may be fastened along at least a portion of the panel sides 32 in any suitable manner including, but not limited to, adhesive bonding, stitching or mechanical connection. It should also be noted that the hook and loop fastening material on one of the panel sides 32 is preferably mounted on an inner surface 26 of the panel 24 while the opposing panel side 32 has the hook and loop fastening material mounted on the outer surface 28 of the panel 24. In this manner, the hook and loop fastener may be overlapped and connected to one another along the panel sides 32 when the pull tool 10 is placed in the sleeve configuration 48 as best seen in FIG. 6.

Although the fastening mechanism 42 as illustrated herein is described as hook and loop fastener material, it should be noted that the fastening mechanism 42 may comprise a variety of any suitable fasteners including, but not limited to, snaps, zippers extending along the panel sides 32, a plurality of buckles spaced along the panel sides 32, or any other removable fastening mechanism that can be placed along the panel sides 32. However, hook and loop fastener is the preferred configuration due to its convenience of use and its ability to quickly and easily fasten the panel sides 32 with different amounts of overlap 44 in order to encase elongate articles of different size. As was earlier mentioned, the installation process may include sliding installation of the pull tool 10 along a support structure such as along a subfloor of an aircraft cabin or fuselage. In this regard, the hook and loop fastening material is preferred due to its flexibility and relative softness which may prevent scraping or scratching of surfaces along which the pull tool 10 is installed.

Referring still to FIGS. 1-5, the fastening mechanism 42 is preferably configured to join the panel sides 32 together in order to form the panel 24 in the sleeve configuration 48 wherein the elongate article 14 such as the wire harness 16 illustrated in the figures may be encased. Ideally, the panel 24 is sized and configured to encase the elongate article 14 in the sleeve configuration 48 without any portion of the elongate article 14 protruding out of the pull tool 10. However, it is contemplated that the panel 24 may be sized and configured in certain applications wherein it is desired to have a portion of the elongate article 14 protruding.

Furthermore, the pull tool 10 may be configured such that one size accommodates elongate articles of various sizes. In this regard, the fastening mechanism 42 may be configured to accommodate such size variations. For example, although shown as being comprised of relatively thin strips disposed along the panel sides 32, the fastening mechanism 42 (i.e., hook and loop fastener) may be provided in widths which facilitate encasing elongate articles of various cross-sectional sizes and/or shapes when the pull tool 10 is placed in the sleeve configuration 48. The hook and loop fastener mounted along the panel sides 32 may be installed in relatively wide strips (e.g., up to 6 inches or more in width). In this manner, the panel sides 32 may be adjusted relative to one another and fastened together with various amounts of overlap 44 as shown in FIG. 6 in order to wrap and encase articles of varying width or direction.

In a further embodiment, the fastening mechanism 42 may be applied to at least one of the panel ends 34 such that the panel end 34 may be closed off or sealed in order to facilitate sliding installation of the panel end 34 in confined spaces. As best seen in FIGS. 1 and 5, the hook and loop fastener may be arranged on the panel end 34 wherein hook material may be provided between strips of loop material (or vice versa) on the inner surface 26 of the panel 24. A gap may be provided between the adjacent ends of each hook and loop fastener strip to facilitate folding of the pull panel 24 in order to place the pull tool 10 in the sleeve configuration 48 as shown in FIG. 6. In a further embodiment, both of the panel ends 34 may include fastening mechanism 42 such that both of the panel ends 34 may be sealed or closed off to protect the elongate article.

The panel 24 may be fabricated of any suitable material having flexibility but which is preferably non-stretchable at least in a direction along a tool axis 12 of the pull tool 10. In this regard, the panel 24 is preferably fabricated of a relatively thin material which is somewhat pliable and which provides a reduced amount of friction on at least the outer surface 28 of the panel 24. In one embodiment, the panel 24 may be fabricated of reinforced nylon although other suitable materials such as canvas or Cordura may be used.

The reinforced nylon is preferably provided in a suitable thickness to prevent protrusion of the elongate article 14 encased therewithin. The material is also preferably of a thickness that prevents or minimizes snagging of the pull tool 10 on structure during sliding installations in vehicles and other applications. For example, aircraft may include a variety of intercostals 76 and bulkheads through which the pull tool 10 must be threaded. The panel 24 is preferably sufficiently thick and/or rigid to prevent bulging of components of the elongate article 14 which may otherwise catch on intercostals 76 or bulkheads as the pull tool 10 is installed.

As was earlier mentioned, a low coefficient of friction of the outer surface 28 of the panel 24 facilitates sliding installation of the pull tool 10 along structural members. In this regard, the outer surface 28 of the panel 24 is preferably provided with a smooth or low friction coating 30 or surface which is also preferably resistant to abrasion.

In the preferred embodiment, the nylon may be a woven nylon reinforced in a grid pattern with polyethylene threads.

The polyethylene threads may comprise a high molecular weight polyethylene or thermoplastic having a low coefficient of friction and self-lubricating properties. Such reinforced nylon may resist puncturing or tearing of the panel 24. Furthermore, woven nylon reinforced with polyethylene threads may minimize adhesion that may otherwise occur with conventional nylon fabrics. The panel 24 preferably has a weight (i.e., thickness) that is suitable for containing or encasing the elongate article 14 but yet is sufficiently flexible or pliable to allow snaking of the pull tool 10 amongst various vehicular and non-vehicular installations.

Other materials from which the panel 24 may be fabricated include, without limitation, any woven or non-woven fabric and which may comprise a suitable coating 30 at least on the outer surface 28 such as a may have a polymeric coating 30 of PVC and/or acrylic and/or vinyl or any other suitable low-friction coating in order to facilitate low friction sliding of the pull tool 10. The panel 24 may be fabricated of polyester, polyester-cotton or any other material or combination thereof. The panel 24 may also be fabricated of at least one of plastic-impregnated or plastic-coated canvas to reduce the coefficient of friction of the outer surface and to provide increased durability and wear resistance.

Figure 2:
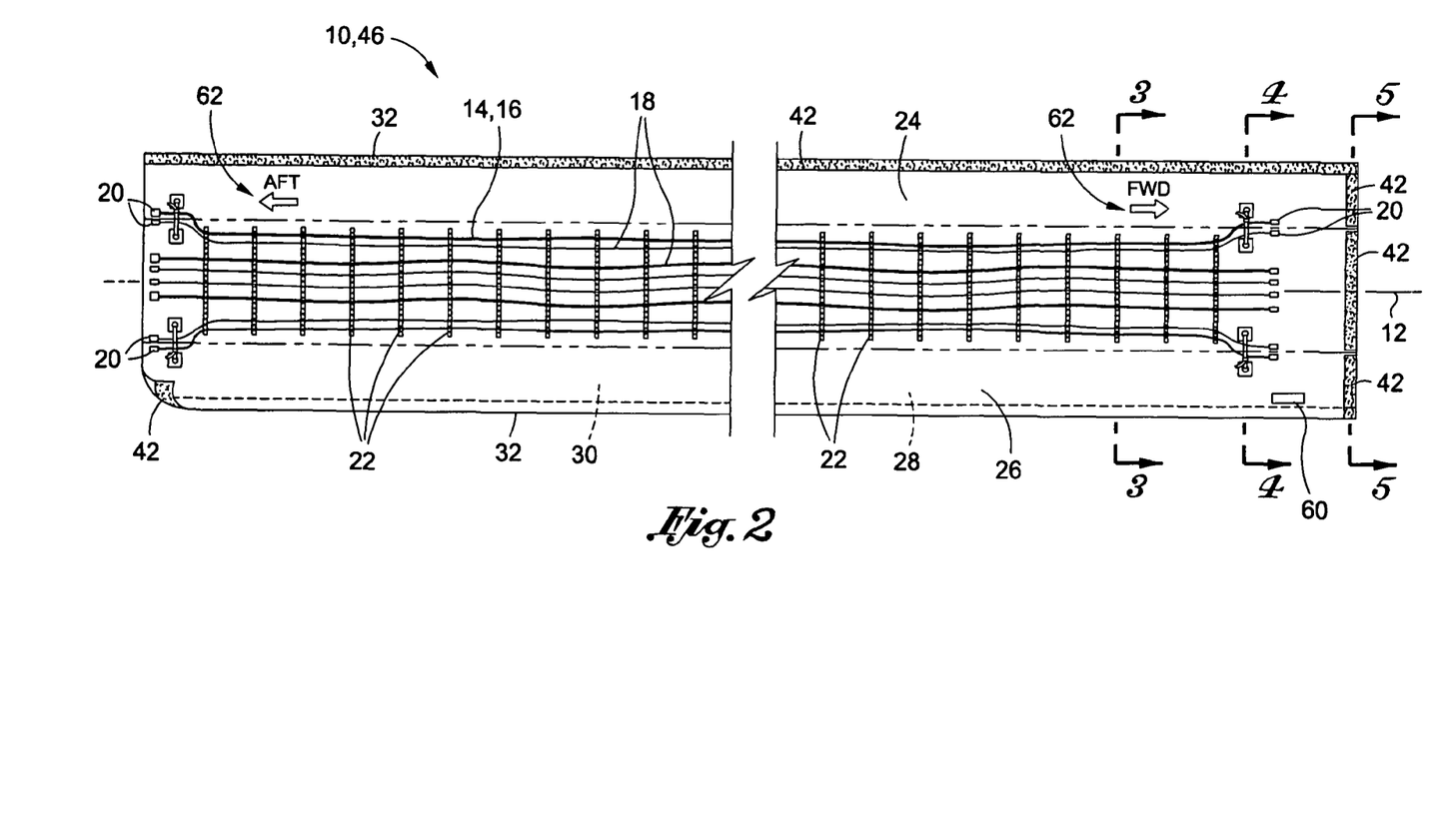
FIG. 2 is a plan view of the pull tool illustrating the positioning of the plurality of wire bundles in one embodiment.
Figure 3:
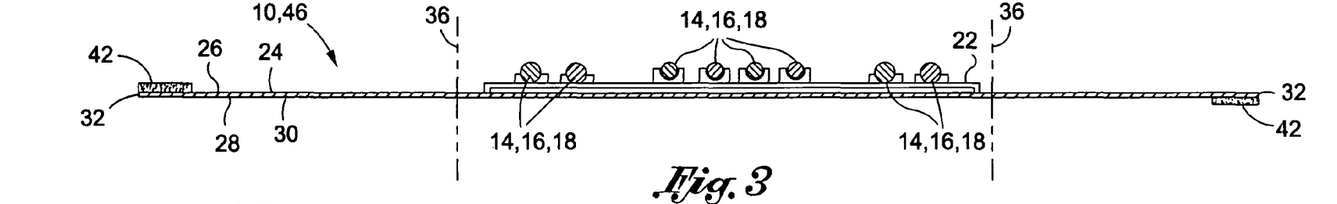
FIG. 3 is a sectional illustration taken along lines 3-3 of FIG. 2 and illustrating the pull tool and wire bundles positioned on an inner surface of the panel.

Referring now to FIGS. 1, 2 and 4, shown is the pull tool 10 having a clamping mechanism 52 preferably disposed adjacent to at least one of the panel ends 34 although the clamping mechanism 52 may be located at any point between the panel ends 34. The clamping mechanism 52 is preferably configured to clamp at least a portion of the elongate article 14 to the inner surface 26 of the panel 24. In this regard, the clamping mechanism 52 prevents relative movement of the elongate article 14 to the panel 24 and thereby maintains the relative position of the elongate article 14 as the pull tool 10 is installed in position.

As can be seen in FIGS. 1, 2 and 4, the clamping mechanism 52 may be comprised of a suitable strap or tie such as a plastic cable tie 54 commonly known as a zip tie or tie wrap. The cable tie 54 may be inserted through a pair of grommets 56 optionally included with the pull tool 10 and disposed in space relation on the panel 24. As best seen in FIG. 4, the grommets 56 may be installed in the panel 24 with at least one and, more preferably, a pair of reinforcing patches 58 on inner and outer surfaces 26, 28 of the panel 24 at the locations of the grommets 56. The reinforcing patches 58 may be formed of any suitable material such as any metallic or nonmetallic material and may be installed such that the perimeter edges thereof are sized to fall within the perimeter of the reinforcing patches 58. In one embodiment, the clamping mechanism 52 is configured to clamp at least a portion of the elongate article 14 to the inner surface 26 in order to prevent relative movement of the wire harness 16 assembly within the pull tool 10.

As best seen in FIGS. 1 and 2, the clamping mechanism 52 may be preferably disposed on opposing panel sides 32 of the panel 24 in order to maintain the position of the elongate article relative to the panel 24. Likewise, several pairs of the clamping mechanisms 52 may be installed at each of the panel ends 34 in order to maintain the position of the elongate article 14 relative to the panel 24. Additional clamping mechanisms 52 may be installed at various locations between the panel ends 34 or at any location between the panel sides 32. Furthermore, other mechanisms may be utilized for clamping the elongate article 14 to the panel 24. For example, cable lacing, binding knots, or Velcro type hook and loop fastener strips may be utilized as may twist ties or metal buckle clips or other strap configurations. However, use of plastic cable ties 54 as the clamping mechanism 52 is most preferable due to the capability for binding electrical cables or wires together in various amounts and of various sizes.

Furthermore, plastic cable ties 54 are commonly used and are conveniently installable to organize cables and wires. It should also be noted that the elongate article 14 may be secured to the panel 24 using various clamping mechanisms 52 which may be attached to other areas of the elongate article 14 other than the wire harness 16 illustrated in FIGS. 1 and 2. For example, the clamping mechanism 52 may be secured around spanner bars 22 optionally included with the wire bundles 18. In this regard, the wire bundles 18 that make up the elongate article 14 may include a plurality of spaced-apart spanner bars 22 which may be utilized during installation of the wire harness 16 within a vehicle or structure in order to support such wire harnesses and bundles 16, 18.

Figure 8:
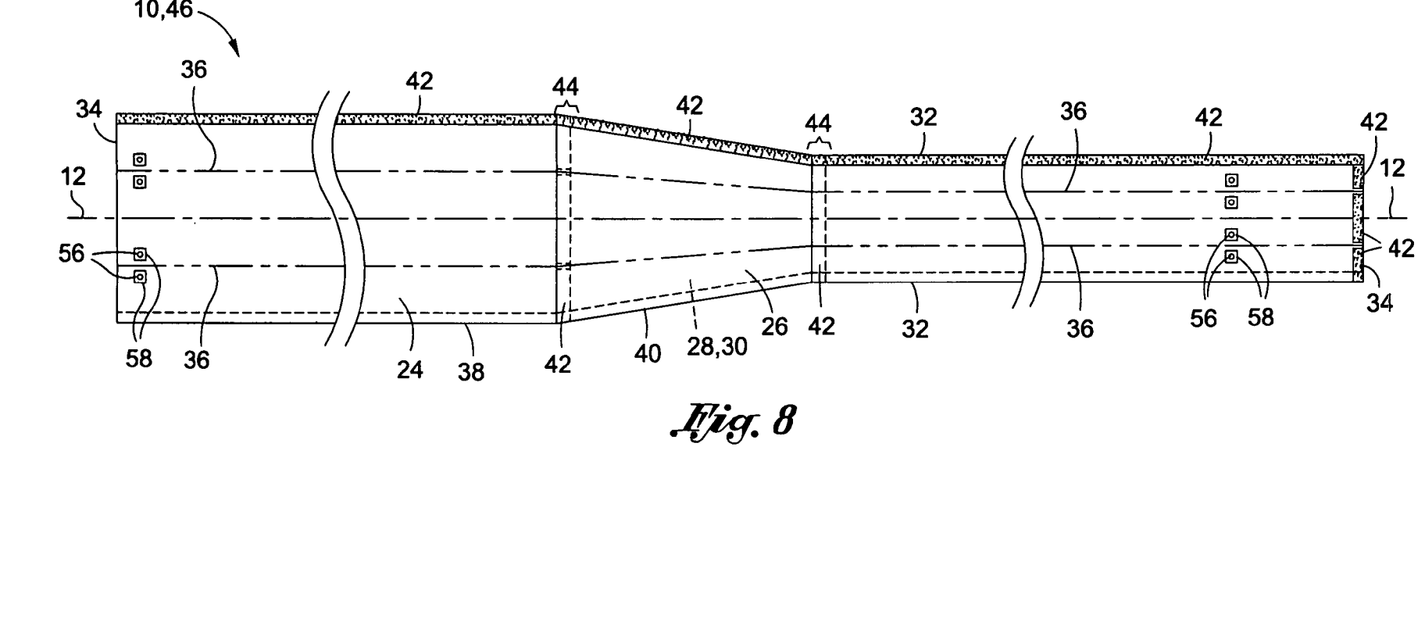
FIG. 8 is a plan view of the pull tool in an alternative embodiment wherein the panel comprises a tapered panel interposed between a pair of rectangularly shaped panel sections.

Referring briefly now to FIG. 8, shown is the pull tool 10 in an alternative embodiment having a tapered panel 40 interposed between a pair of rectangularly configured panel sections 38. The tapered panel 40 may facilitate a reduction in the overall size of the pull tool 10 when placed in the sleeve configuration 48 in order to facilitate installation of the pull tool 10 in structures or vehicles wherein the cross-sectional area is reduced along the length thereof. For example, in certain aircraft, the depth of the subfloor into which the wire harness 16 is installed may reduce from a depth of 10 inches to a depth of 1½ inches along a length of the subfloor. Therefore, it may be necessary to neck down or reduce the size of the cross-sectional area of the pull tool 10 in the sleeve configuration 48 such that the pull tool 10 may be slidably installed without binding as a result of the reduction in the depth of the subfloor.

The rectangularly shaped panel sections 38 may be joined to the tapered panel 40 by any suitable means including sewing, adhesive bonding or by the use of a detachable fastening mechanism 42 such as hook and loop fastener as was earlier described. As can be seen in FIG. 8, such fastening mechanism 42 may be provided between each of the adjoining panel sections 38 and the tapered panel 40 to facilitate interconnection thereof. In this configuration, it is contemplated that various sized tapered panels 24 may be interchangeably installed between the rectangularly shaped panel sections 38 to allow forming of the pull tool 10 in a variety of sizes, shapes and configurations. The pull tool 10 configuration illustrated in FIG. 8 may include at least one, and more preferably, a pair of the clamping mechanisms 52 at each of the panel ends 34 to minimize or prevent movement of the elongate article 14 (i.e., wire harness) relative to the pull tool 10.

Figure 7:
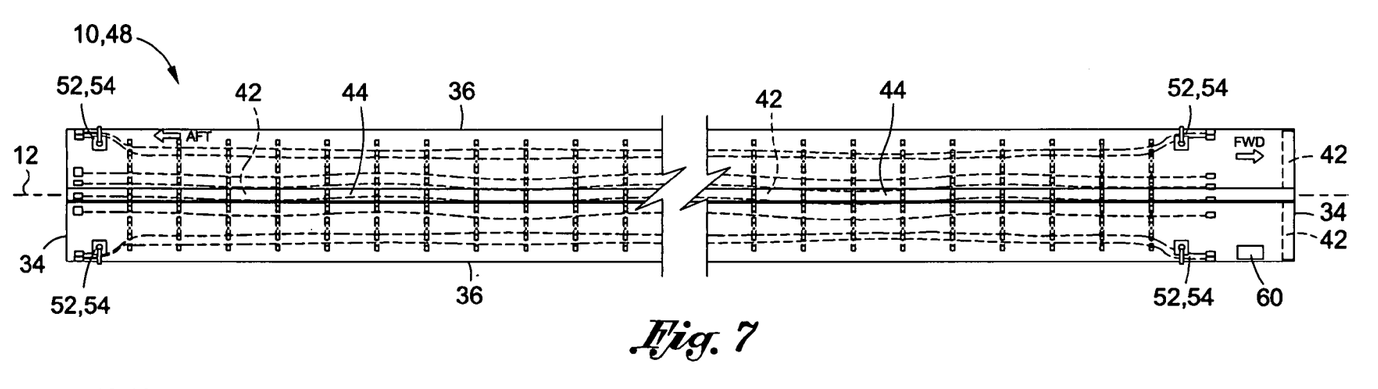
FIG. 7 is a plan view of the pull tool in the sleeve configuration illustrating the panel sides joined together via the fastening mechanisms.

Referring briefly now to FIGS. 1, 2 and 7, shown is the pull tool 10 in the open configuration 46 in FIGS. 1 and 2 and in the sleeve configuration 48 in FIG. 7. In the open and sleeve configurations 46, 48, a marking locator 60 may be provided on the inner and/or outer surfaces 26, 28 of the panel 24 to indicate a desired positioning of the elongate article 14 relative to the panel 24. The marking locator 60 may be provided in any suitable configuration such as a patch sewn or bonded to the panel 24 and/or as indicia formed by permanent marking, painting, stenciling or other means. Likewise a corresponding marking locator 60 may be provided on the outer surface 28 as best seen in FIG. 7 and which may be positioned complementary to the marking locator 60 on the inner surface 26.

Such marking locator 60 may provide a visual feature for aligning the pull tool 10 or various components of the elongate article 14 (e.g., connectors 20) with a corresponding connector 20 or other feature of the vehicle or structure into which the elongate article 14 is installed. Likewise, a direction indicator 62 may be installed on at least one of inner and/or outer surfaces 26, 28 of the panel 24 as shown in FIGS. 2 and 7 to facilitate the desired orientation inside a vehicle or structure.

Figure 9A:
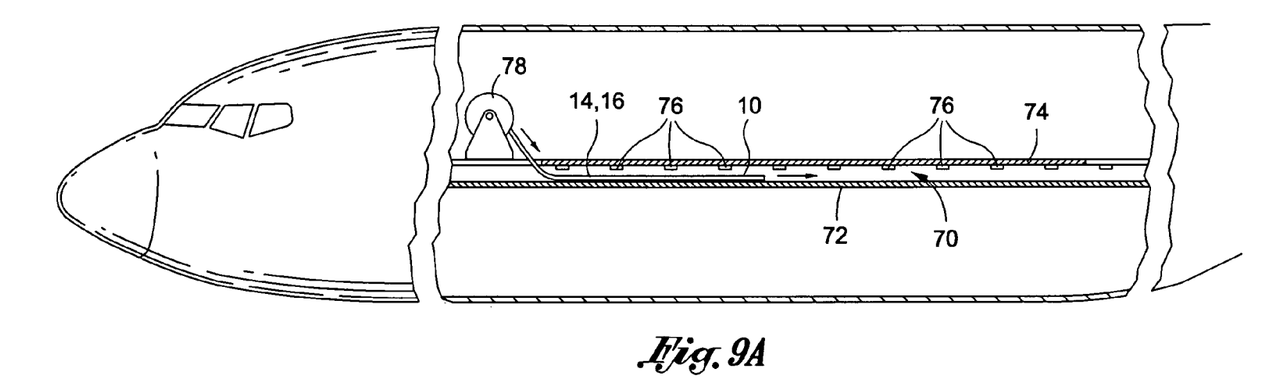
FIG. 9A is an illustration of the pull tool encasing the wire bundles prior to installation in an aircraft.
Figure 9B:
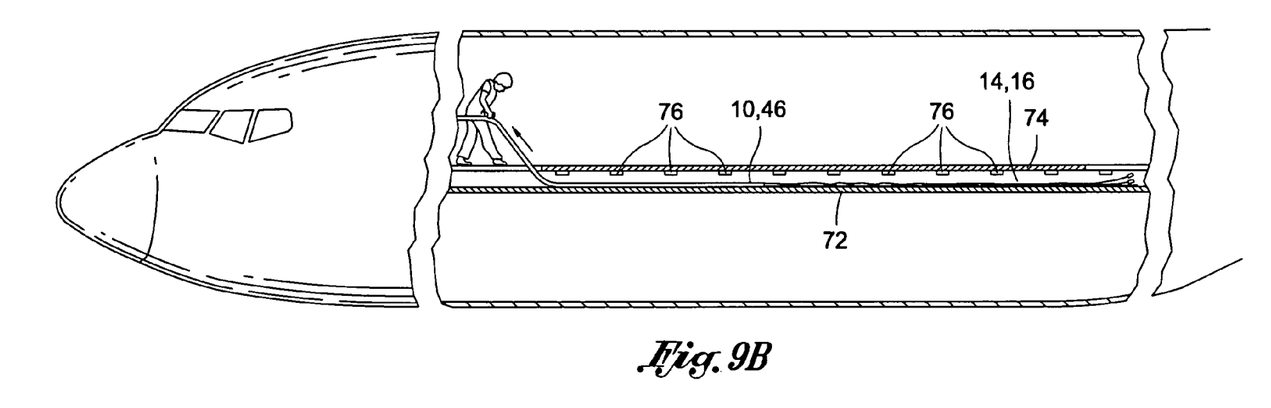
FIG. 9B is an illustration of the pull tool being removed following installation of the wire bundles.
Figure 10:
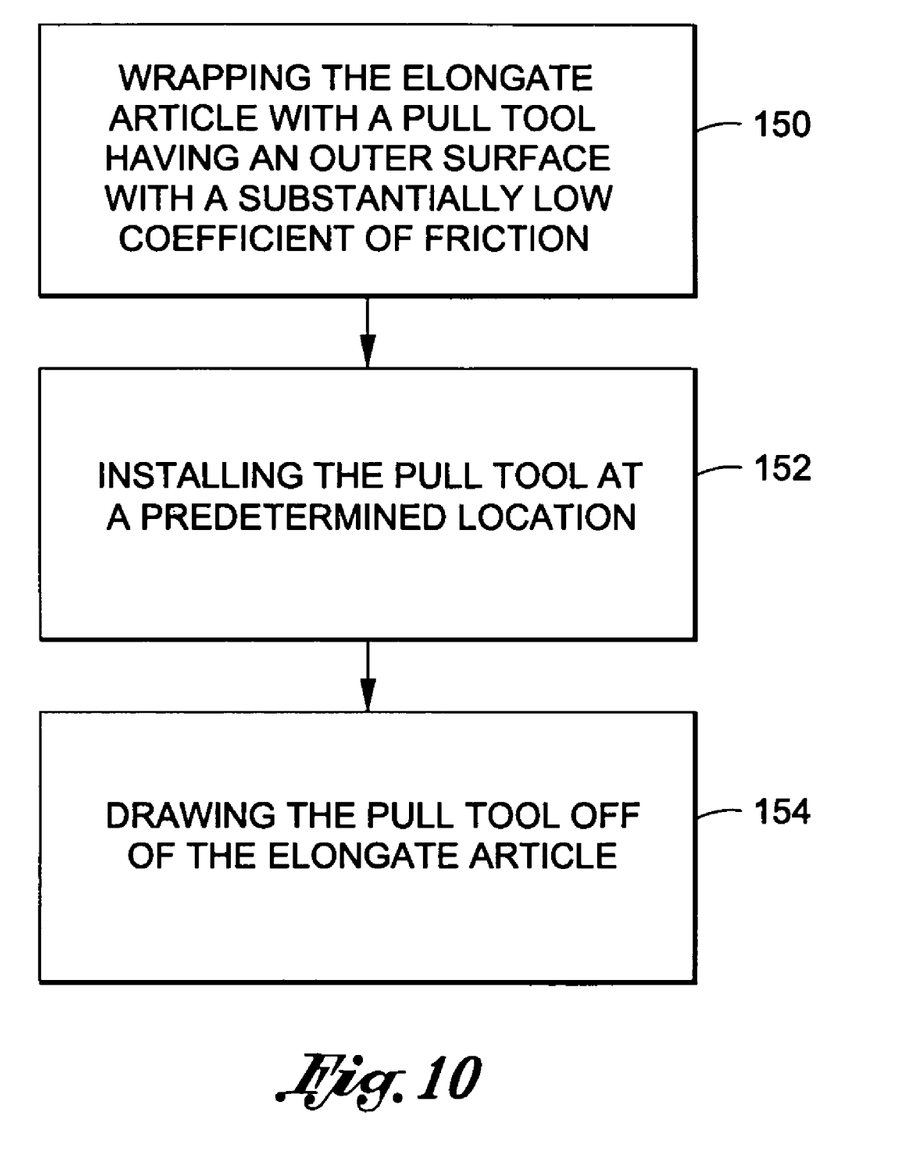
FIG. 10 is a flow diagram illustrating a method of installing the wire bundles into the aircraft in an advantageous embodiment.

Referring to FIGS. 9A, 9B and 10, a method of handling the elongate article 14 using the pull tool 10 will now be described. As was earlier mentioned, the elongate article 14 may comprise multiple wire harnesses 16 and/or wire bundles 18 which may be assembled in a family group. Each of the wire bundles 18 may comprise individual wiring conductors or cable and associated components such as connectors 20 and spanner bars 22 for support thereof. The family group may be fabricated in a conventional sense on a bench-mounted form board in a harness assembly facility.

The wire bundles 18 and wire harnesses 16 may be formed using the form board and a computer model representing a desired finished configuration of the wire harness 16. As is known in the art, form boards are conventionally employed to build the wire harness 16 with associated wire elements such as wire cables and may include tie bars, spacers, and connectors for completing the wire bundles 18. The completed wire bundles 18 may be mounted to appropriate support structure such as the spanner bars 22 illustrated in FIGS. 1 and 2.

Following completion of the family group, the pull tool 10 may be placed in the open configuration 46 with the inner surface 26 being exposed as shown in FIG. 1. The wire harness 16 may then be placed on the inner surface 26 of the panel 24. Care may be taken to ascertain correct orientation of the wire harness 16 by reference to direction indicators 62 optionally included on the inner surface 26 of the pull tool 10 as shown in FIG. 7.

The wire harness 16 may also be positioned on the pull tool 10 using the marking locators 60 for visual alignment with various components of the wire harness 16 such as with the connectors 20 as best seen in FIG. 1. The wire harness 16 may include various breakouts and other components of the wire harness 16 which may be dressed and oriented in the proper location while the pull tool 10 is in the open configuration 46. If clamping mechanisms 52 such as tie wraps are included, such clamping mechanisms 52 are preferably threaded through the grommets 56. The desired portions of the wire harness 16 may be secured to the inner surface 26 of the panel 24 by cinching the fastening mechanisms 42 (i.e., tie wraps) in order to maintain position of the wire harness 16 relative to the panel 24 during installation.

The method as shown in FIG. 10 may further comprise step 150 of wrapping the elongate article 14 with the pull tool 10 wherein the outer surface 28 of the panel 24 preferably has a substantially low coefficient of sliding friction to facilitate sliding installation of the pull tool 10 within the vehicle or structure. The opposing panel sides 32 may be joined together using the fastening mechanism 42 which, in the preferred embodiment illustrated and described above, comprises hook and loop fastener material disposed in strips along the panel sides 32. Optionally, at least one of the panel ends 34 may be closed off by joining the fastening mechanisms 42 (i.e., hook and loop fastener material) optionally disposed on the panel 24 end. The closed off panel end 34 may prevent snagging of the pull tool 10 on various structure such as of a vehicle as the pull tool 10 is slid into place.

Referring to FIG. 10, the method may further optionally comprise the steps of winding or spooling the pull tool 10 onto a spool 78 or other handling equipment in order to facilitate storage and/or installation of the relatively lengthy pull tool 10. Due to its size and weight, it may be necessary to lift and carry the pull tool 10 by mechanical means such as by using a fork lift for lifting the spool 78 into position such as inside an aircraft fuselage. Once in position, step 152 in FIG. 10 comprises installing the pull tool 10 with the encased wire harness 16 at the predetermined location 70 such as within the aircraft fuselage subfloor. The pull tool 10 may be spooled off of the spool 78 and simultaneously installed into position. In this regard, the method may comprise sliding the pull tool 10 along a support surface 72 or other structure in a direction parallel to the tool axis 12.

Ideally, the pull tool 10 is installed such that the closed off panel end 34 is the leading end as may be ascertained by reference to the direction indicators 62 optionally included on the outer surface 28 of the pull tool 10 as shown in FIG. 7. The pull tool 10 may be slid along inside the vehicle or structure until positioned at the predetermined location 70 which may be visually ascertained by reference to marking locators 60 on the outer surface 28 of the panel 24. Once the pull tool 10 is in the correct position, the clamping mechanisms 52 such as tie wraps may be removed such as by cutting. In step 154, the pull tool 10 may then be slid or drawn off of the wire harness 16 in a direction along the tool axis 12 as shown in FIG. 9B such that the wire harness 16 remains in position at the predetermined location. During removal of the pull tool 10, one of the panel ends 34 may be held in place while the pull tool 10 is drawn off and out from underneath the wire harness 16. The empty pull tool 10 may then be wound back onto the spool 78 or otherwise removed from the vehicle for reuse.

Figure 11:
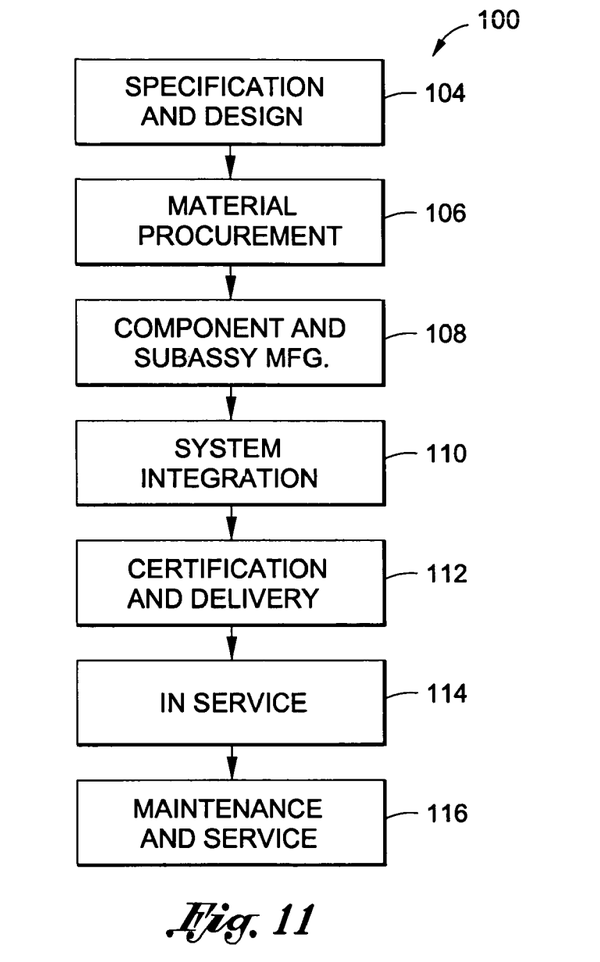
FIG. 11 is a flow diagram of an aircraft production and service methodology.
Figure 12:
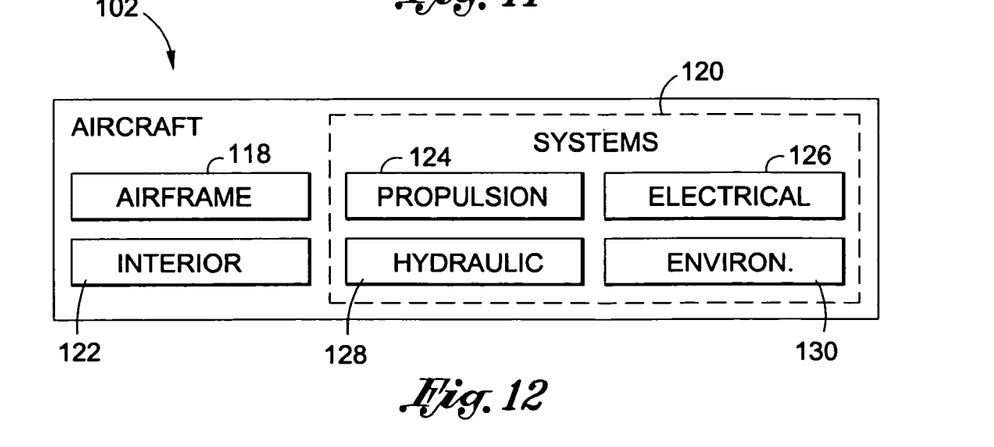
FIG. 12 is a block diagram of an aircraft.

Referring to FIGS. 11-12, embodiments of the disclosure may be described in the context of an aircraft manufacturing and service method 100 as shown in FIG. 11 and an aircraft 102 as shown in FIG. 12. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosed embodiments may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A pull tool for removably encasing an elongate article, comprising:
   a panel defining inner and outer surfaces and having opposing panel sides and opposing panel ends when the panel is in an open configuration; and
   a fastening mechanism extending along at least a portion of the panel sides;
   a clamping mechanism extended through a thickness of the panel at a location non-coincident with the panel sides and panel ends, the clamping mechanism being configured to clamp at least a portion of the elongate article to the inner surface of the panel;
   the fastening mechanism being configured to join the panel sides to form the panel in a sleeve configuration for encasing the elongate article therewithin;
   the outer surface having a substantially low coefficient of friction.

2. The pull tool of claim 1 wherein the outer surface is coated with a low friction coating.

3. The pull tool of claim 2 wherein the low friction coating is a polymeric coating.

4. The pull tool of claim 3 wherein the polymeric coating comprises at least one of the following: PVC, acrylic, vinyl.

5. The pull tool of claim 1 wherein the panel is at least partially fabricated of reinforced nylon.

6. The pull tool of claim 5 wherein the reinforced nylon is woven nylon reinforced with polyethylene threads.

7. The pull tool of claim 1 wherein:
   the pull tool defines a longitudinally extending tool axis;
   the panel being substantially non-stretchable along the tool axis.

8. The pull tool of claim 1 wherein one of the panel ends includes the fastening mechanism disposed along at least a portion thereof such that the panel end may be closed off.

9. The pull tool of claim 1 wherein the fastening mechanism is attached to the panel sides by at least one of the following: adhesive bonding, mechanical fastening, sewing.

10. The pull tool of claim 1 wherein the fastening mechanism comprises hook and loop fastener.

11. The pull tool of claim 1 wherein the fastening mechanism is configured to facilitate varying amounts of overlap of the panel sides in the wrapped position.

12. The pull tool of claim 1 wherein the clamping mechanism comprises a cable tie.

13. The pull tool of claim 1 wherein the panel includes a pair of grommets installed adjacent to the panel ends for extending the clamping mechanism therethrough and wrapping around the elongate article.

14. A method of handling an elongate article comprising the steps of:
   wrapping the elongate article with a pull tool having panel sides and panel ends and an outer surface with a substantially low coefficient of friction;
   clamping at least a portion of the elongate article to an inner surface of the panel using a clamping mechanism extended through a thickness of the panel at a location non-coincident with the panel sides and panel ends;
   installing the pull tool at a predetermined location;
   removing the clamping mechanism prior to drawing the pull tool off of the elongate article; and
   drawing the pull tool off of the elongate article.

15. The method of claim 14 wherein the predetermined location includes a support surface, the pull tool defining a tool axis, the step of installing the pull tool comprising:
   sliding the pull tool along the support surface in a direction of the tool axis until the pull tool is in the predetermined location.

16. The method of claim 14 wherein the pull tool includes a panel having inner and outer surfaces and opposing panel sides and having a fastening mechanism disposed along at least a portion of the panel sides, wherein the step of wrapping the elongate article further comprises:
   laying out the panel in an open configuration;
   placing the elongate article on the inner surface;
   folding the panel over the elongate article; and
   joining the opposing panel sides together using the fastening mechanism.

17. The method of claim 14 wherein the panel includes at least one marking locator on at least one of inner and outer surfaces thereof.

18. The method of claim 14 wherein the panel comprises a fastening mechanism disposed along at least one of the panel ends, the method further comprising the step of:
   closing off the panel end using the fastening mechanism.

19. The method of claim 14 wherein the panel is fabricated of reinforced nylon.

20. A method of installing a wire bundle in a predetermined location having a support surface, the method comprising the steps of:
   forming a pull tool having a tool axis, comprising the steps of:
      providing an elongate panel having inner and outer surfaces and opposing panel sides and opposing panel ends and having a fastening mechanism disposed along at least a portion of the panel sides and along one of the panel ends; and
      providing the outer surface with a substantially low coefficient of friction;
   laying out the panel in an open configuration such that the inner surface is exposed;
   placing the wire bundle on the inner surface;
   clamping at least a portion of the wire bundle to the inner surface using a clamping mechanism extended through a thickness of the panel at a location non-coincident with the panel sides and panel ends;
   folding the panel over the wire bundle;
   joining the panel sides using the fastening mechanism mounted thereto such that the pull tool is placed in a sleeve configuration;
   closing off one of the panel ends using the fastening mechanism attached to the panel end;
   sliding the pull tool along the support surface in a direction along the tool axis leading with the closed-off end until the pull tool is positioned at a predetermined location;
   removing the clamping mechanism;
   grasping the wire bundle; and
   sliding the pull tool off of the wire bundle in a direction along the tool axis such that the wire bundle remains in position at the predetermined location.

21. The method of claim 20 wherein the panel is fabricated of reinforced nylon.

* * * * *